(12) United States Patent  (10) Patent No.: US 7,543,942 B2
Yoo  (45) Date of Patent: Jun. 9, 2009

(54) AUTOMATIC DOOR MECHANISM FOR PROJECTOR

(75) Inventor: Seung-Hon Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 640 days.

(21) Appl. No.: 11/367,593

(22) Filed: Mar. 6, 2006

(65) Prior Publication Data

US 2006/0268238 A1  Nov. 30, 2006

(30) Foreign Application Priority Data

May 24, 2005  (KR) ...................... 10-2005-0043428

(51) Int. Cl.
G03B 21/00  (2006.01)
(52) U.S. Cl. ........................................ 353/52; 353/119
(58) Field of Classification Search .................... 353/52, 353/57, 58, 60, 61, 74, 87, 88, 119, 122; 348/748; 359/341.32, 395; 362/373, 375; 352/202
See application file for complete search history.

(56) References Cited

U.S. PATENT DOCUMENTS

| | | | | |
|---|---|---|---|---|
| 6,056,405 | A * | 5/2000 | Heintz et al. | 353/85 |
| 6,109,767 | A * | 8/2000 | Rodriguez | 362/294 |
| 6,693,381 | B2 * | 2/2004 | Bell et al. | 315/112 |
| 6,955,434 | B2 * | 10/2005 | Hsu | 353/61 |
| 6,981,770 | B2 * | 1/2006 | Murai et al. | 353/61 |
| 7,137,709 | B2 * | 11/2006 | Takemi | 353/85 |
| 7,264,362 | B2 * | 9/2007 | Clark et al. | 353/119 |
| 7,338,174 | B2 * | 3/2008 | Koba et al. | 353/88 |
| 7,344,279 | B2 * | 3/2008 | Mueller et al. | 362/294 |
| 2004/0080719 | A1 * | 4/2004 | Morinaga | 353/61 |
| 2004/0212784 | A1 * | 10/2004 | Hsu | 353/61 |
| 2005/0062938 | A1 * | 3/2005 | Murai et al. | 353/61 |
| 2005/0077308 | A1 * | 4/2005 | Ishii | 220/830 |
| 2006/0119802 | A1 * | 6/2006 | Akiyama | 353/94 |
| 2007/0024214 | A1 * | 2/2007 | Souza et al. | 315/309 |

* cited by examiner

*Primary Examiner*—William C Dowling
*Assistant Examiner*—Danell L Owens
(74) *Attorney, Agent, or Firm*—Birch, Stewart, Kolasch & Birch, LLP

(57) ABSTRACT

An automatic door apparatus of a projector is provided. The projector includes a case. The case has a heat discharging opening for discharging heat out of the projector. The automatic door apparatus includes: a frame disposed at the case, the frame facing the heat discharge opening; a door assembly reciprocally movable along the frame in a first direction for opening and closing the heat discharge opening; and a driving unit disposed in the case for moving the door assembly along the first direction, the driving unit moving the door assembly along the first direction from a first position to a second position to open the heat discharge opening in response to a first operation mode of the projector, the driving unit moving the door assembly along the first direction from the second position to the first position to close the heat discharge opening in response to a second operation mode of the projector.

25 Claims, 6 Drawing Sheets

AUTOMATIC DOOR MECHANISM FOR PROJECTOR

CROSS-REFERENCE TO RELATED APPLICATION

This Nonprovisional Application claims priority under 35 U.S.C. §119(a) on Patent Application No. 10-2005-0043428 filed in Korea on May 24, 2005, the entire contents of which are hereby incorporated by reference.

BACKGROUND OF THE INVENTION

1. Field of the Invention

The present invention relates to an opening/closing apparatus for a small door mounted at an electrical/electronic apparatus, and more particularly to an exhaust door opening/closing apparatus for facilitating discharging heat out of a projector. Specifically, the present invention relates to an automatic door mechanism for a slim type wall-hanging or stand-up beam projector.

2. Description of the Related Art

Recently, distribution of projectors capable of obtaining image information via a large screen is suddenly increased in order to satisfy demands of consumers as broadcasting via high definition televisions are thriving and markets of home theater system are expanded.

As typical examples of projectors, beam projectors widely utilized for presentation by being connected, for example, to a computer have been widely marketed and already become popular. These types of beam projectors are operated in such a manner that an image matrix is projected with a light source onto a large scale screen by micro mirrors (Digital Mirror Devices, DMDs), or by Liquid Crystal Devices (LCDs) in a fixed-in-space projection beam.

As illustrated in FIG. 1, a desk-top beam projector is the main stream for the conventional beam projector in which the projector is set in and supported by a pad such as a table. The desk-top beam projector as shown in FIG. 1 is manufactured in a rectangular box-type cradle of an external casing 10 in which components including a light source, an optical system (not shown) and a projection lens unit 11 are housed.

The beam projector adopts as a light source a high voltage discharging lamp, for example, a mercury lamp, a xenon lamp or a metal halide lamp such that it is inevitable to emit high temperature driving heat. As a result, radiant heat dischargers are needed. As illustrated in FIG. 1, a plurality of radiator grilles 12 capable of ventilating air are disposed at various locations of the external casing 10. Consequently, the conventional beam projector is structured in such a manner that an air discharge structure dissipating high temperature driving heat via radiant heat dischargers such as the radiator grilles 12 is disposed directly about a user.

There is a disadvantage in this type of air discharge structure according to the conventional method as described in that an increase of the driving time of a beam projector causes a temperature rise in ambient air of an interior space such that a periodical ventilation is needed which decreases the operating efficiency and simultaneously leaves a user in poor surroundings.

In an effort to avoid the disadvantage, attempts have been vigorously made to develop slim external casing beam projectors so that they can be hung up on a wall or stood up just like flat panel LCD (Liquid Crystal Display) TV or Plasma Display Panels (PDPs).

However, problems still exist in that it is difficult for the slim type beam projectors to secure enough inner space in the external casing, causing inconvenience in arranging components inside the casing, and designing and manufacturing discharge structures for effective release of the driving heat. Accordingly, mechanism development of discharge structure capable of effectively discharging driving heat of the slim type beam projector is demanded in earnest.

SUMMARY OF THE INVENTION

Accordingly, the present invention has been made to solve the aforementioned problems occurring in the discharge structure of the conventional beam projectors. More particularly, the present invention is disclosed to satisfy a demand on design and manufacturing of an effective discharge structure in a beam projector usable for wall hanging and stand-up, and it is an object of the present invention to provide an automatic door mechanism for a beam projector having an improved discharge structure of driving heat so that excellent radiation effect and performances can be secured.

Another object is to provide an automatic door mechanism for a beam projector configured to automatically open and close a discharge door in response to an operation mode during operation of the beam projector to thereby provide convenience and reliability for a user.

Still another object is to provide an automatic door mechanism for a slim wall hanging or stand-up type beam projector configured to provide excellent radiation efficiency and performance, and improve product reliability.

In order to accomplish these objects, an automatic door apparatus of a projector is provided. The beam projector includes a case. The case has a heat discharging opening for discharging heat out of the beam projector. The automatic door apparatus comprises a frame disposed at the case, the frame facing the heat discharge opening; a door assembly reciprocally movable along the frame in a first direction for opening and closing the heat discharge opening; and a driving unit disposed in the case for moving the door assembly along the first direction, the driving unit moving the door assembly along the first direction from a first position to a second position to open the heat discharge opening in response to a first operation mode of the beam projector, the driving unit moving the door assembly along the first direction from the second position to the first position to close the heat discharge opening in response to a second operation mode of the beam projector.

According to another aspect of the present invention, a projector comprises a case, the case having a heat discharging opening for discharging heat out of the beam projector; a frame disposed at the heat discharging opening; a door assembly reciprocally movable along the frame in a first direction for opening and closing the heat discharging opening; a driving unit disposed in the case for moving the door assembly along the first direction, the driving unit moving the door assembly along the first direction from a first position to a second position to open the heat discharge opening in response to a first operation mode of the beam projector, the driving unit moving the door assembly along the first direction from the second position to the first position to close the heat discharge opening in response to a second operation mode of the beam projector.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
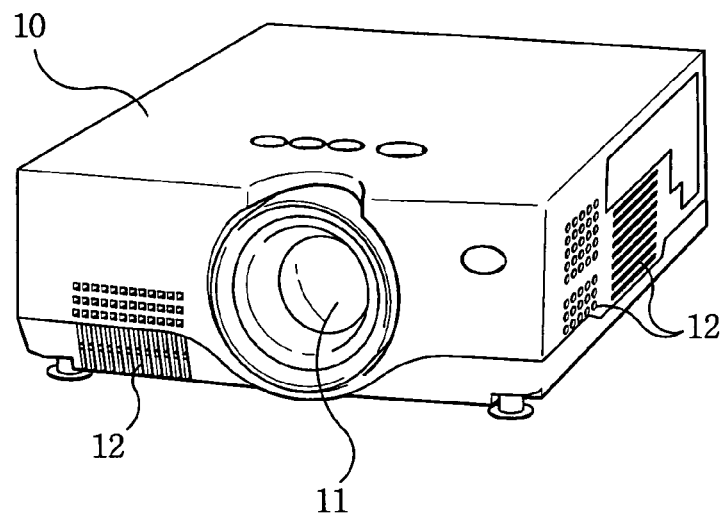
FIG. 1 is an exemplary external perspective view schematically illustrating a conventional beam projector.
Figure 2:
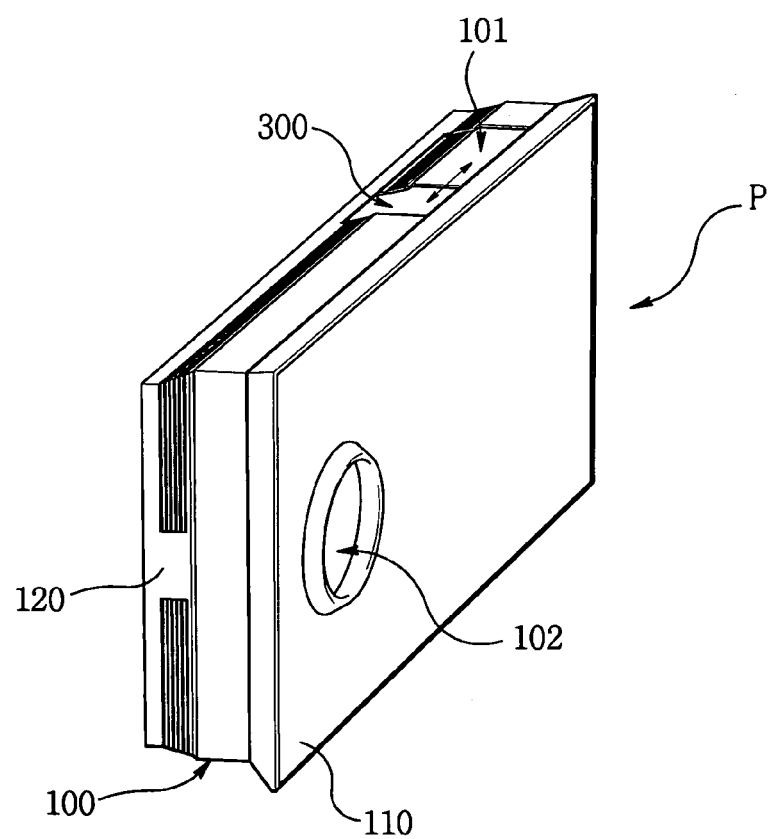
FIG. 2 is a schematic external perspective view illustrating a slim type beam projector adopted with an automatic door mechanism according to an embodiment of the present invention.

FIG. 2 is a schematic external perspective view illustrating a slim type beam projector adopted with an automatic door mechanism according to an embodiment of the present invention. An case 100 has a framed panel style external structure formed by a front case 110 and a rear case 120, each separately manufactured and coupled therebetween, such that it has a slim-down style to be used for wall hanging or stand-up purpose as in, for example, flat panel LCD (Liquid Crystal Display) TVs or Plasma Display Panels (PDPs).

In the illustrated embodiment, a discharge unit 101 is located close to the top side of the case 100. The heat generated in the projector is induced upwardly and discharged through the heat discharging opening at the top side of the case 100. A discharge door assembly 300 is provide to operate in cooperation with a driving state of the engine part to selectively open and close the heat discharge opening, and an electric driving unit (see FIGS. 3 to 7) for moving the discharge door assembly 300.

Meanwhile, the case 100 is disposed therein with projector components such as a light source for generating image information and projecting the image information in enlarged form on a screen, an optical system (not shown), image generating means such as Digital Mirror Devices (DMDs) or Liquid Crystal Devices (LCDs) and a projecting lens unit 102. However, a detailed structural arrangement thereof is not described.

Figure 3:
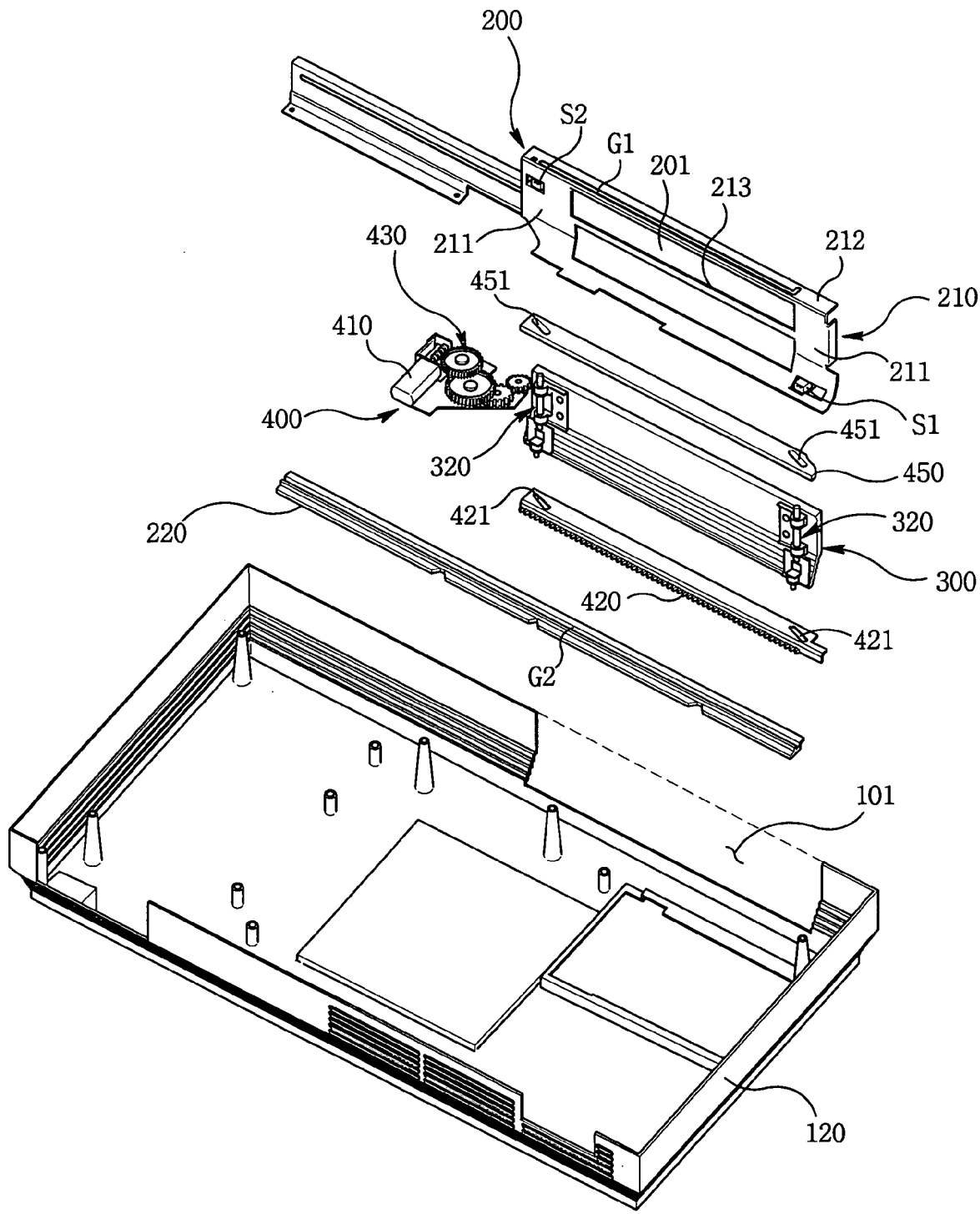
FIG. 3 is a schematic exploded perspective view illustrating the automatic door mechanism for a slim type beam projector according to an embodiment of the present invention.
Figure 4:
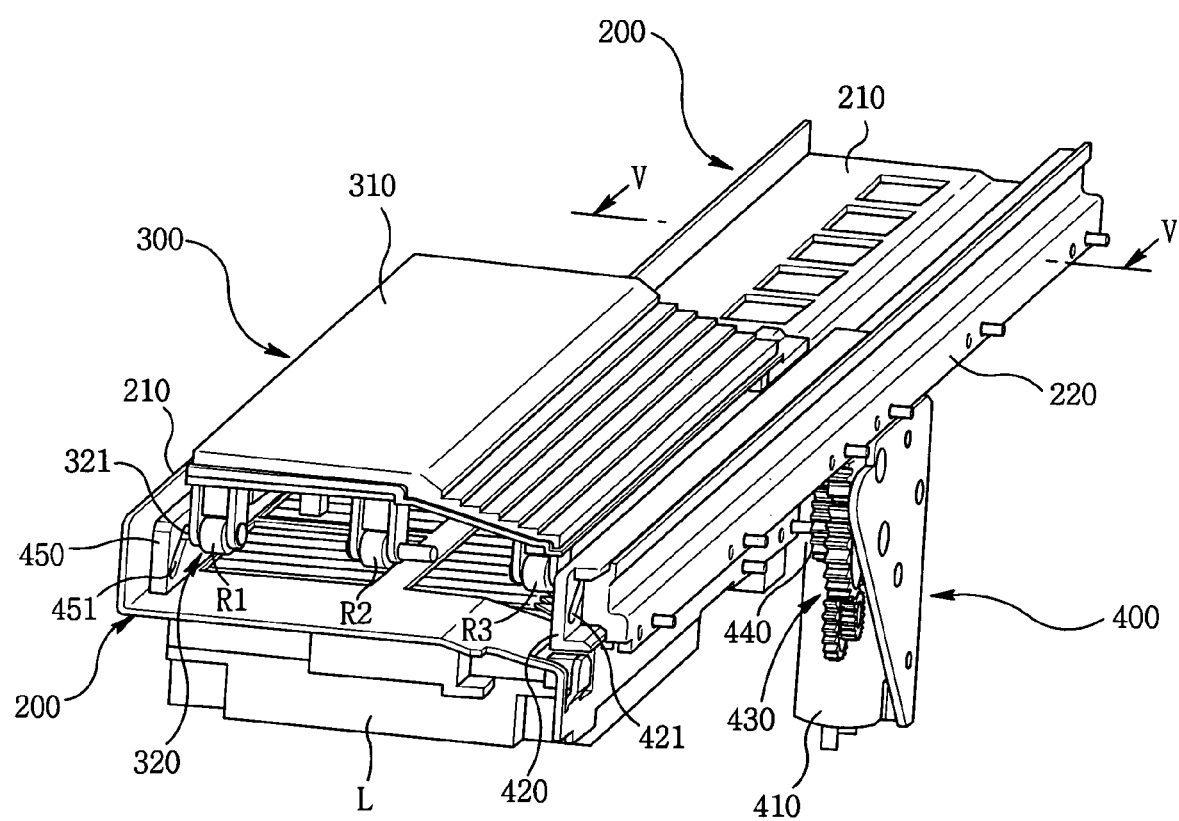
FIG. 4 is a schematic perspective view of the automatic door mechanism for the slim type beam projector shown in FIG. 3.
Figure 5:
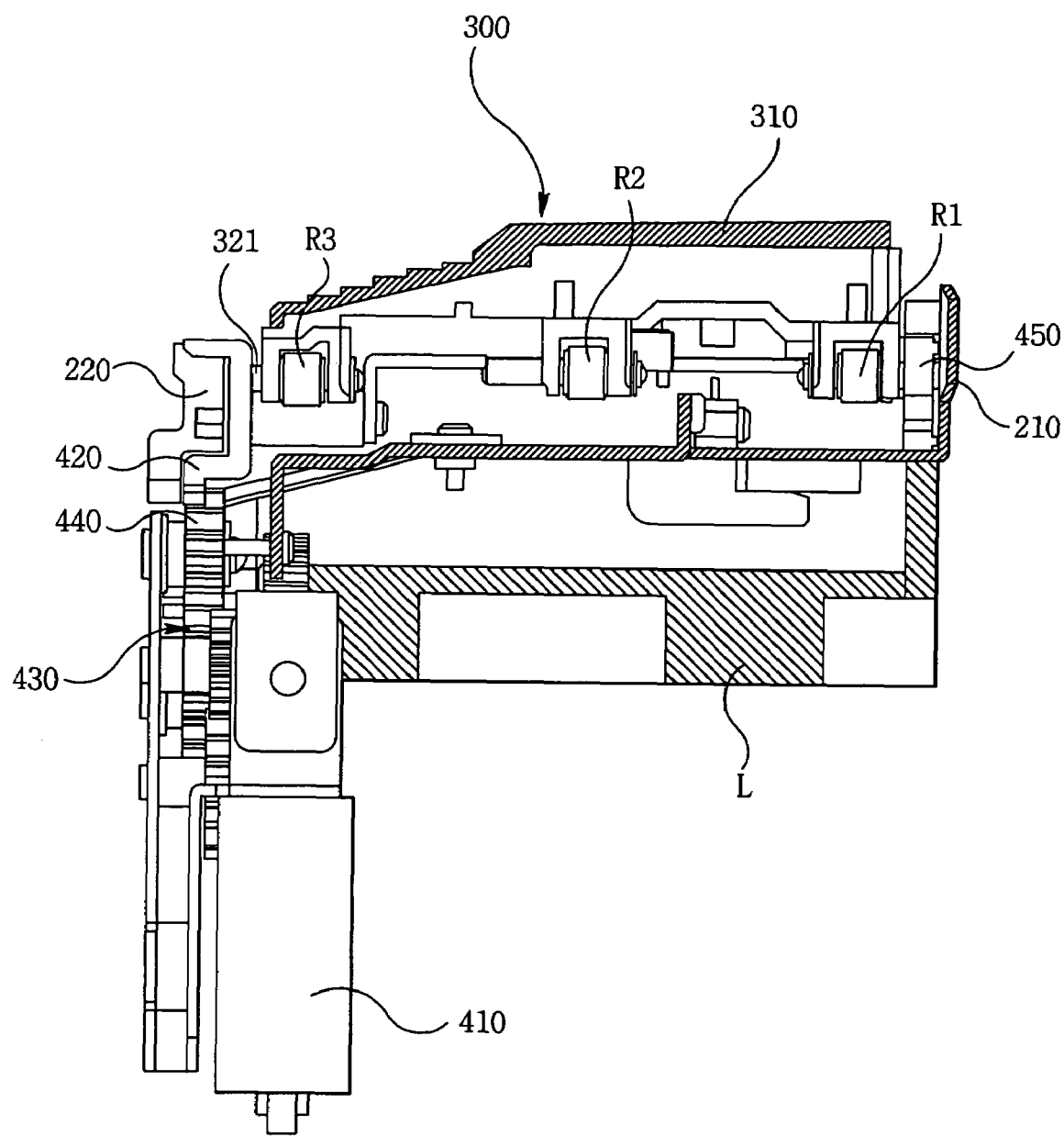
FIG. 5 is a schematic cross-sectional view taken along line V-V of FIG. 4.

Now, referring to FIGS. 3, 4 and 5, an automatic door mechanism for the slim type beam projector according to an embodiment of the present invention includes a frame 200, a door assembly 300 and a driving unit 400.

The frame 200 is disposed at the case 100 facing the heat discharging opening. The door assembly 300 is reciprocally disposed at the frame 200 to open and close the heat discharging opening. The driving unit 400 below door assembly 300 to reciprocally drive the door assembly 300.

According to one embodiment of the present invention, the frame 200 includes a guide sash 210 and a guide bracket 220 for supporting the door assembly 300 so that the door assembly 300 can reciprocally move. The guide sash 210 and the guide bracket 220 are respectively mounted with first and second slit type guide rails (G1, G2) for guiding the reciprocating movement of the door assembly 300.

Figure 6:
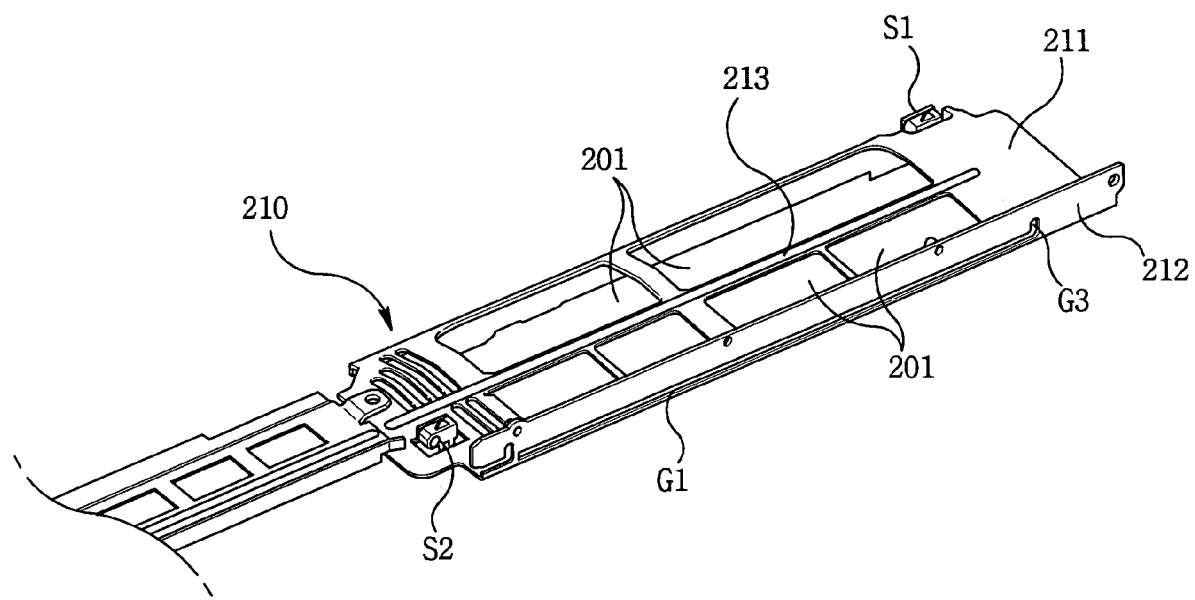
FIG. 6 is a schematic perspective view illustrating a frame unit of FIGS. 3 to 5.

Referring to FIG. 6, the guide sash 210 includes a planar body 211 formed with an opening 201 communicating with the discharge unit 101, and a lateral wall 212 bent at least one lateral distal end of the body 211. The lateral wall 212 is formed with the first slit type guide rail (G1).

In FIGS. 3 and 6, there are switch sensors S1 and S2 for sensing an open/close state by contacting the door member 310 of the door assembly 300. The switch sensors (S1, S2) may include various types of sensing means of, for example, contact type sensors such as a limit switch, or a non-contact sensor such as an optical detector.

Furthermore, a guide rib 213 is formed to cross the opening 201 of the guide sash 210. The guide rib 213 is disposed to support in such a manner that a guide roller (R2) of a slide apparatus 320 mounted at the door assembly 300 (described later) rolls.

As shown in FIGS. 4 and 5, a louver L is disposed to prevent inroad of foreign objects when the heat discharging opening is opened. In addition, the guide sash 210 may be a single-piece structure or an assembled structure in which components are separately manufactured and assembled, as respectively shown in FIGS. 3 and 6.

In an embodiment, the guide bracket 220 has a strip-shaped stick structure coupled in parallel to the top side of the case 100. In other words, the guide bracket 220 and the guide sash 210 are respectively mounted to the top side of the case 100 so that the first and second slit type guide rails (G1, G2) are oppositely arranged in parallel on a moving path of the door assembly 300.

In another embodiment of the present invention, although it is not shown in the drawing, a guide bracket-less structure may be formed wherein another lateral wall is formed at the other lateral distal end of the body 211 of the guide sash 210, and the aforementioned second slip type guide rail is formed at the another lateral wall.

Figure 7:
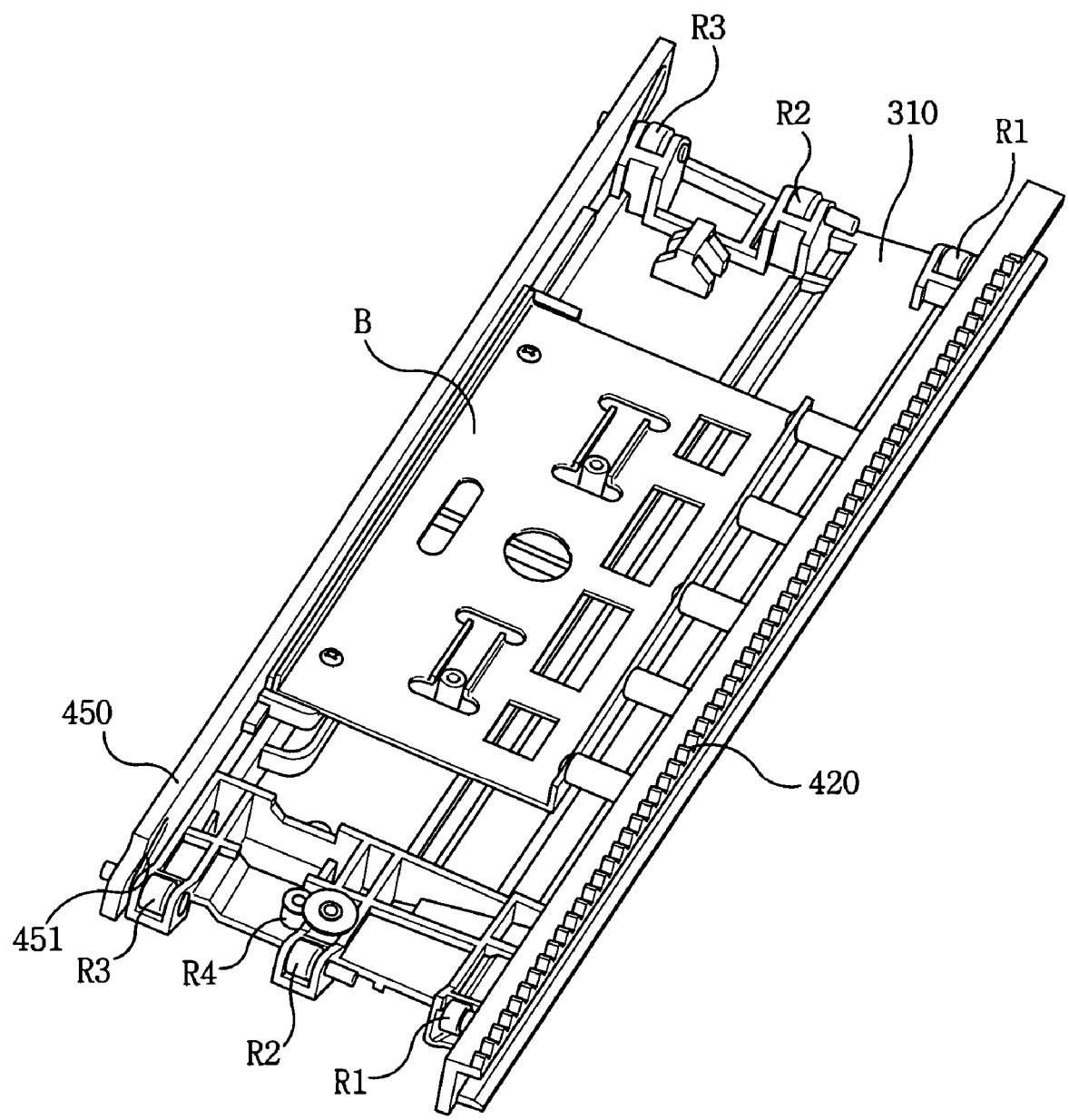
FIG. 7 is a schematic perspective view of a bottom surface of the door assembly of FIGS. 3 to 5.

Referring to FIGS. 3, 5 and 7, the door assembly 300 includes a door member 310 linearly and reciprocally disposed on the guide sash 210, and a slide apparatus 320 for coupling the guide sash 210 to the door member 310 so that the door member 310 can slide.

The slide apparatus 320 includes a pair of slide shafts 321 respectively disposed at an upstream side and a downstream side of the bottom surface of the door member 310 so that both respective distal ends thereof can be slidably coupled to the first and second slit type guide rails (G1, G2), and a plurality of roller members (R1, R2, R3).

The roller members (R1, R2, R3) roll to contact the guide sash 210 and serve to guide so that the door member 310 can smoothly slide. The driving unit 400 includes a driving motor 410 disposed in the case 100, a rack member 420 lengthwise disposed at one side of the door member 310, a gear train 430 as power transmission means disposed between an output axis of the driving motor 410 and the rack member 420 for power transmission, and a pinion 440 meshed with the rack member 420.

In another embodiment, the driving unit 400 further includes lifting means for vertical movement of lifting up and moving down the door assembly 300. Referring to FIGS. 4 to 7, the lifting means includes a cam bracket 450 disposed in parallel at the door assembly 300 to face the rack member 420, a pair of cam grooves 421 (see FIG. 4) and 451 are respectively formed at the rack member 420 and the cam bracket 450. The lifting means further includes lifting rails (G3; see FIG. 6) vertically extends from distal ends of the first and second slit type guide rails (G1, G2).

In FIG. 7 a bridge bracket B is disposed to prevent deformation of the assembled structure of the components, and provide a space between the rack member 420 and the cam bracket 450. Furthermore, the component R4 is a horizontal guide roller, which, although not shown in the drawing, rolls along a guide rib disposed at the frame 200, and guides the sliding movement of the door member 310.

The cam grooves 421 and 451 restrain a pair of slide shafts disposed at the door member 310 for cam-following. Therefore, the pair of slide shafts 321 vertically changes the moving direction along the lifting rail (G3). Subsequently, the door member 310 moves down from an initial position at the start of opening operation and then horizontally slides. Furthermore, the door member 310 first horizontally slides during the closing operation and when it reaches a finishing step, the door member 310 lifts up back to the initial position.

In another embodiment, the pair of cam grooves 421 and 451 may be mounted at lateral walls in a bent form at both sides of the guide sash 210. The cam bracket 450 is removed in this embodiment. In an embodiment, the cam grooves 421 and 451 are grooves having a slanted structure so that the door member 310 can be induced to lift up and move down at a predetermined height at the start and finishing steps of sliding motion.

In addition, the gear train 430 is installed with a friction type clutch gear (not shown) which functions as a safety device to prevent parts from breakdown caused by racing of the clutch gear, even in case, for example, that the door member 310 is forcibly stopped by intrusion of foreign objects or alternatively the door member 310 is forcibly moved.

Now, operation of the automatic door mechanism for the slim type beam projector will be explained in detail.

First of all, if a main driving switch (not shown) of the beam projector is turned on, the driving motor 410 is driven in response to a control signal of a main controller (not shown) to sequentially drive the gear train 430 and the pinion 440.

As a result, a linear movement of the rack member 420 meshed with the pinion 440 starts and simultaneously the door member 310 coupled to the rack member 420 starts to move. At the start of the associated operation, the door member 310 is moved down for a predetermined time from an initially set position by a predetermined stroke by mutual interference among the lifting means, i.e., the slide shaft 321, the cam grooves 421 and 451 and the lifting rail (G3). The moving stroke moved down by the door member 310 can be adjusted according to the length of the lifting rail (G3).

Next, as the door member 310 completes the move-down movement and the slide shaft 321 is moved to a location where a linear movement is possible along the guide sash 210 and the guide rails (G1, G2) of the guide bracket 220. Then the door member 310 performs an opening operation moving along the horizontal direction.

Subsequently, as the switch sensor (S2) at the downstream side is operated in the course of opening movement process of the door member 310 to transmit signal information to the main controller, the driving motor 410 stops its operation. As a result, the door member 310 stops sliding under the opened state in which the heat discharging opening is opened.

As described above, an operational process of a projector is conducted in which a light source of the beam projector is on in response to a control signal of the main controller while the door member 310 is opened, and the image information is displayed on a screen by the driving of an engine part.

When an operation is processed in such a fashion where the driving of the engine part (not shown) is turned off, the door member 310 horizontally moves in a reverse direction by a reverse process and operation of the aforementioned opening operation, and at the time of finishing step, the door member 310 lifts up to be set to the initial position and closes the heat discharging opening.

In a nutshell, the automatic door mechanism for a projector as illustrated performs an operation in such a manner that the discharge door automatically opens and closes the heat discharging opening in response to an operation mode during operation of the projector. The operation mode of the projector may include an ON operation mode, an OFF operation mode, or other operation modes. When the projector operates in the ON operation mode, the door assembly is moved to open the discharging opening. For example, the ON operation mode may occur when the projecting function is turned on or when the temperature in the case is above a predetermined temperature. When the projector operates in the OFF operation mode, the door assembly is moved to close the heat discharging opening. For example, the OFF operation mode may occur when the projecting function is turned off or when the temperature in the case is below a predetermined temperature. Other operation modes such as maintenance mode can be set to open the heat discharging opening for maintenance purpose and close the heat discharging opening after maintenance is done.

As apparent from the foregoing, the following operational effects can be secured from the automatic door mechanism for a projector as illustrated.

First, demand for a manufacturing design of an effective discharge structure of a projector, particularly a slim type beam projector can be satisfied whereby an excellent radiation efficiency and performance can be obtained to provide product reliability and quality.

Second, an automatic door mechanism can be automatically opened and closed to the convenience of a user during operation of the projector according to an operation mode of the projector.

Third, as the automatic door mechanism is automatically opened and closed in response to an operation mode of the projector, radiation effect can be improved and inroad of foreign objects can be avoided to promote stabilized performance and prolonged life of the product.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic door apparatus of a projector, the projector including a case, the case having a heat discharging opening for discharging heat out of the projector, the automatic door apparatus comprising:

a frame disposed at the case, the frame facing the heat discharge opening;

a door assembly reciprocally movable along the frame in a first direction for opening and closing the heat discharge opening; and a driving unit disposed in the case for moving the door assembly along the first direction, the driving unit moving the door assembly along the first direction from a first position to a second position to open the heat discharge opening in response to a first operation mode of the projector, the driving unit moving the door assembly along the first direction from the second position to the first position to close the heat discharge opening in response to a second operation mode of the projector.

2. The apparatus of claim 1, wherein the first operation mode of the projector is an ON operation mode and the second operation mode of the projector is an OFF operation mode, and the driving unit moves the door assembly along the first direction to open the heat discharge opening to discharge the heat when the projector operates in the ON operation mode, and the driving unit moves the door assembly along the first direction to close the heat discharge opening when the projector operates in the OFF operation mode.

3. The apparatus of claim 2, wherein the door assembly is movable along a second direction, so that the driving unit moves the door assembly from an initial position along the second direction to the first position before moving the door assembly along the first direction to open the heat discharge opening when the projector operates in the ON operation mode, and the driving unit moves the door assembly along the second direction from the first position to the initial position after moving the door assembly along the first direction to close the heat discharge opening when the projector operates in the OFF operation mode.

4. The apparatus of claim 1, wherein the frame includes a first guide rail and a second guide rail, the first and second guide rails being located in parallel along the first direction, the door assembly being slidable along the first and second guide rails in the first direction.

5. The apparatus of claim 4, wherein the frame includes a guide sash and a guide bracket respectively mounted on two opposite sides of the case, the first guide rail and the second guide rail being respectively located on the guide sash and the guide bracket.

6. The apparatus of claim 5, wherein the guide sash includes:

a planar body with an opening communicating with the heat discharge opening; and a pair of bent lateral walls respectively disposed at both distal ends of the planar body, wherein the first guide rail is disposed at one of the pair of the lateral walls.

7. The apparatus of claim 4, wherein the door assembly includes:

a door member disposed at the frame; and a slide apparatus for slidably coupling the door member to the frame.

8. The apparatus of claim 7, wherein the slide apparatus includes a pair of slide shafts respectively mounted at an upstream side and a downstream side of a bottom surface of the door member so that both distal ends of the slide shafts are slidably coupled to the first and second guide rails.

9. The apparatus of claim 8, wherein the slide apparatus further includes a plurality of roller members disposed at the bottom surface of the door member into contact with the frame during movement of the door member in the first direction.

10. The apparatus of claim 4, wherein the driving unit includes:

a driving motor disposed inside the case;

a gear train connected to an output axis of the driving motor;

a pinion connected to the gear train; and a rack member disposed at the door assembly to engage with the pinion for reciprocal movement of the door assembly in the first direction.

11. The apparatus of claim 1, wherein the door assembly is movable along the frame in a second direction, and the driving unit further includes a lifting device for moving the door assembly along the second direction.

12. The apparatus of claim 11, wherein the first direction and the second direction are perpendicular.

13. The apparatus of claim 12, wherein the first direction is a horizontal direction and the second direction is a vertical direction.

14. The apparatus of claim 11, wherein the frame includes a first guide rail and a second guide rail, the first and second guide rails being located in parallel along the first direction, the door assembly being slidable along the first and second guide rails in the first direction, a slit extending along a second direction from an end of each of the first and second guide rails, the door assembly being slidable along the slits in the second direction.

15. The apparatus of claim 14, wherein the lifting device includes:

a cam bracket disposed at the door assembly to face a rack member of the driving unit, the rack member being disposed at the door assembly to engage with a pinion of the driving unit for reciprocal movement of the door assembly in the first direction;

a pair of cam grooves disposed at the rack member and the cam bracket, the pair of cam grooves restraining slide shafts of the door assembly for cam-following to move the door assembly in the second direction, the slide shafts being located at a bottom surface of the door assembly so that both distal ends of the slide shafts pass through the cam grooves and are slidable along the slits in the second direction.

16. The apparatus of claim 1, wherein the heat discharge opening is located at a top side of the case so as to discharge the heat upwardly.

17. The apparatus of claim 1, wherein the case has a framed panel structure for wall-hanging or standing up.

18. A projector, comprising:

a case, the case having a heat discharging opening for discharging heat out of the projector;

a frame disposed at the heat discharging opening;

a door assembly reciprocally movable along the frame in a first direction for opening and closing the heat discharging opening;

a driving unit disposed in the case for moving the door assembly along the first direction, the driving unit moving the door assembly along the first direction from a first position to a second position to open the heat discharge opening in response to a first operation mode of the projector, the driving unit moving the door assembly along the first direction from the second position to the first position to close the heat discharge opening in response to a second operation mode of the projector.

19. The projector of claim 18, wherein the first operation mode of the projector is an ON operation mode and the second operation mode of the projector is an OFF operation mode, and the driving unit moves the door assembly along the first direction to open the heat discharge opening to discharge the heat when the projector operates in the ON operation mode, and the driving unit moves the door assembly along the first direction to close the heat discharge opening when the projector operates in the OFF operation mode.

20. The projector of claim 19, wherein the door assembly is movable along a second direction, the driving unit moves the door assembly from an initial position along the second direction to the first position before moving the door assembly along the first direction to open the heat discharge opening when the projector operates in the ON operation mode, and the driving unit moves the door assembly along the second direction from the first position to the initial position after moving the door assembly along the first direction to close the heat discharge opening when the projector operates in the OFF operation mode.

21. The projector of claim 20, wherein the frame includes a first guide rail and a second guide rail, the first and second guide rails being located in parallel along the first direction, the door assembly being slidable along the first and second guide rails in the first direction by the driving unit.

22. The projector of claim 21, wherein the door assembly includes a pair of slide shafts respectively mounted at an upstream side and a downstream side of a bottom surface of the door assembly so that both distal ends of the slide shafts are slidably coupled to the first and second guide rails.

23. The projector of claim 22, wherein a slit extends along the second direction from an end of each of the first and second guide rails, the door assembly being slidable along the slits in the second direction by the driving unit.

24. The projector of claim 23, wherein the driving unit includes a lifting device for moving the door assembly along the second direction, the lifting device including:
   a cam bracket disposed at the door assembly to face a rack member of the driving unit, the rack member being disposed at the door assembly to engage with a pinion of the driving unit for reciprocal movement of the door assembly in the first direction;
   a pair of cam grooves disposed at the rack member and the cam bracket, the pair of cam grooves restraining slide shafts of the door assembly for cam-following to move the door assembly in the second direction, the slide shafts being located at a bottom surface of the door assembly so that both distal ends of the slide shafts pass through the cam grooves and are slidably along the slits in the second direction.

25. The projector of claim 18, wherein the heat discharge opening is located at a top side of the case so that the heat is dischargeable upwardly via the heat discharge opening.

\* \* \* \* \*